(12) United States Patent
Luff et al.

(10) Patent No.: US 11,218,855 B2
(45) Date of Patent: Jan. 4, 2022

(54) MANAGING INTERACTION CONSTRAINTS

(71) Applicant: ARM IP Limited, Cambridge (GB)

(72) Inventors: Geraint David Luff, Cambridgeshire (GB); Andrew John Pritchard, Cambridgeshire (GB); James Crosby, Cambridgeshire (GB)

(73) Assignee: ARM IP Limited, Cambridge (GB)

( * ) Notice: Subject to any disclaimer, the term of this patent is extended or adjusted under 35 U.S.C. 154(b) by 414 days.

(21) Appl. No.: 15/214,035

(22) Filed: Jul. 19, 2016

(65) Prior Publication Data

US 2017/0031333 A1 Feb. 2, 2017

(30) Foreign Application Priority Data

Jul. 31, 2015 (GB) ...................... 1513563

(51) Int. Cl.
 *H04W 4/70* (2018.01)
 *G06Q 20/00* (2012.01)
 *H04W 4/50* (2018.01)
 *H04W 4/80* (2018.01)
(52) U.S. Cl.
 CPC .............. *H04W 4/70* (2018.02); *G06Q 20/00* (2013.01); *H04W 4/50* (2018.02); *H04W 4/80* (2018.02)
(58) Field of Classification Search
 CPC .......... G06Q 20/00; H04W 4/50; H04W 4/70; H04W 4/80
 See application file for complete search history.

(56) References Cited

U.S. PATENT DOCUMENTS

| 7,398,209 B2* | 7/2008 | Kennewick | G10L 15/22 704/255 |
| 7,603,381 B2* | 10/2009 | Burke | G06Q 10/063 705/28 |
| 7,949,529 B2* | 5/2011 | Weider | G06F 17/30864 704/235 |

(Continued)

FOREIGN PATENT DOCUMENTS

| CN | 202257235 U | 5/2012 |
| CN | 104468815 A | 3/2015 |

(Continued)

OTHER PUBLICATIONS

ZigBee Alliance. "ZigBee Cluster Library Specification", ZigBee Document 075123 14-0142, Revision 5, released Mar. 18, 2015, 967 pages. (Year: 2015).*

(Continued)

*Primary Examiner* — George C Neurauter, Jr.
(74) *Attorney, Agent, or Firm* — Patterson Thuente Pedersen, P.A.

(57) ABSTRACT

A method for operating an electronic device to configure a subject device, the method comprising steps of: receiving an intent from a subject device, wherein the received intent comprises an action identifier identifying an action the subject device wishes to perform; receiving action data about the received intent from an intent store, wherein the action data comprises an action associated with each action identifier, and at least one constraint associated with the action; and generating invocation data to perform the action, wherein the invocation data comprises the action identifier, and zero or more parameters.

16 Claims, 7 Drawing Sheets

(56) References Cited

U.S. PATENT DOCUMENTS

| | | | | |
|---|---|---|---|---|
| 8,280,009 | B2* | 10/2012 | Stepanian | G06F 21/10 379/1.01 |
| 8,539,567 | B1* | 9/2013 | Logue | H04L 63/0884 726/7 |
| 9,231,904 | B2* | 1/2016 | Johnson | H04L 67/34 |
| 9,270,761 | B1* | 2/2016 | Logue | F24F 11/30 |
| 9,313,863 | B2* | 4/2016 | Hershberg | G08C 23/02 |
| 9,400,943 | B2* | 7/2016 | Sharma | H04W 4/70 |
| 9,439,068 | B2* | 9/2016 | Chen | H04W 76/10 |
| 9,462,041 | B1* | 10/2016 | Hagins | H04L 67/10 |
| 9,600,645 | B2* | 3/2017 | Fadell | G08B 27/003 |
| 9,606,817 | B1* | 3/2017 | Efstathopoulos | G06F 9/455 |
| 9,633,004 | B2* | 4/2017 | Giuli | G10L 15/1822 |
| 9,854,063 | B2* | 12/2017 | Borzycki | G06F 21/6218 |
| 10,003,654 | B2* | 6/2018 | Chen | H04L 69/18 |
| 10,299,091 | B2* | 5/2019 | Schoppmeier | H04W 4/70 |
| 10,338,895 | B2* | 7/2019 | Zhang | G06F 8/34 |
| 10,353,939 | B2* | 7/2019 | Shaashua | H04W 4/70 |
| 2003/0023641 | A1* | 1/2003 | Gorman | G06F 16/958 715/234 |
| 2003/0221165 | A1* | 11/2003 | Young | G06F 8/38 715/222 |
| 2004/0054690 | A1* | 3/2004 | Hillerbrand | G06Q 10/06 |
| 2006/0200253 | A1* | 9/2006 | Hoffberg | G05B 15/02 700/19 |
| 2009/0089044 | A1* | 4/2009 | Cooper | G06F 17/275 704/9 |
| 2011/0301943 | A1* | 12/2011 | Patch | G10L 15/265 704/9 |
| 2012/0016678 | A1* | 1/2012 | Gruber | G06F 17/3087 704/275 |
| 2012/0179787 | A1* | 7/2012 | Walsh | H04L 63/0281 709/219 |
| 2012/0209951 | A1* | 8/2012 | Enns | H04L 29/08729 709/217 |
| 2012/0265528 | A1* | 10/2012 | Gruber | G10L 15/18 704/235 |
| 2013/0152092 | A1* | 6/2013 | Yadgar | G10L 15/19 718/102 |
| 2013/0223279 | A1* | 8/2013 | Tinnakornsrisuphap | H04L 41/0809 370/254 |
| 2013/0258918 | A1* | 10/2013 | Rudland | G08C 17/02 370/310 |
| 2013/0275164 | A1* | 10/2013 | Gruber | G10L 17/22 705/5 |
| 2014/0052680 | A1* | 2/2014 | Nitz | G06N 5/02 706/46 |
| 2014/0278349 | A1* | 9/2014 | Grieves | G06F 17/2735 704/8 |
| 2014/0310001 | A1* | 10/2014 | Kalns | G10L 15/1822 704/270.1 |
| 2015/0045960 | A1* | 2/2015 | Caron | G05B 15/02 700/276 |
| 2015/0067173 | A1* | 3/2015 | Igarashi | H04L 41/14 709/226 |
| 2015/0109104 | A1* | 4/2015 | Fadell | G08B 27/003 340/5.65 |
| 2015/0120641 | A1* | 4/2015 | Soon-Shiong | G06N 5/04 706/52 |
| 2015/0156266 | A1* | 6/2015 | Gupta | H04W 4/70 709/224 |
| 2015/0195365 | A1* | 7/2015 | Choi | H04L 67/16 715/739 |
| 2015/0339917 | A1* | 11/2015 | Messing | G08C 17/02 340/12.5 |
| 2016/0095192 | A1* | 3/2016 | Vangeel | G06F 8/654 315/153 |
| 2016/0225372 | A1* | 8/2016 | Cheung | G10L 15/22 |
| 2016/0241660 | A1* | 8/2016 | Nhu | H04W 4/80 |
| 2016/0300138 | A1* | 10/2016 | Volk | G06N 5/022 |
| 2016/0328719 | A1* | 11/2016 | Ananchaperumal | G06Q 30/0201 |
| 2017/0013029 | A1* | 1/2017 | Banerjee | H04L 65/403 |
| 2017/0139556 | A1* | 5/2017 | Josephson | G06F 3/0482 |
| 2017/0195267 | A1* | 7/2017 | Ghafourifar | H04L 51/066 |
| 2017/0208139 | A1* | 7/2017 | Li | H04W 4/70 |
| 2017/0279894 | A1* | 9/2017 | Chen | H04L 69/18 |
| 2018/0048710 | A1* | 2/2018 | Altin | H04W 76/10 |
| 2018/0091621 | A1* | 3/2018 | Kuo | H04L 67/327 |
| 2018/0116004 | A1* | 4/2018 | Britt | H04W 40/125 |
| 2018/0139718 | A1* | 5/2018 | Marten | H04W 64/003 |
| 2018/0299914 | A1* | 10/2018 | Caron | G05B 15/02 |
| 2019/0108353 | A1* | 4/2019 | Sadeh | G06F 21/604 |

FOREIGN PATENT DOCUMENTS

| | | | |
|---|---|---|---|
| WO | WO 2014/190053 | A1 | 11/2014 |
| WO | WO 2015/061678 | A1 | 4/2015 |

OTHER PUBLICATIONS

NXP Laboratories UK. "ZigBee PRO Stack User Guide", JN-UG-3048, revision 2.5, Jun. 10, 2014, 418 pages. (Year: 2014).*

NXP Laboratories UK. "ZigBee Cluster Library User Guide", JN-UG-3077, revision 2.1, Feb. 6, 2015, 832 pages. (Year: 2015).*

C. Perera, A. Zaslavsky, P. Christen, and D. Georgakopoulos, "Context aware computing for the internet of things: A survey," IEEE Communication Surveys and Tutorials, vol. 16, No. 1, pp. 414-454, Jan. 2014, 41 pages. (Year: 2014).*

W3C Working Group. "Web Intents", published May 23, 2013, 11 pages. (Year: 2013).*

Cheng Zheng et al. "An Intents-based Approach for Service Discover and Integration", Proceedings of the 2013 IEEE 17th International Conference on Computer Supported Cooperative Work in Design, 6 pages. (Year: 2013).*

Cheng Zheng et al. "An Adaptive Intent Resolving Scheme for Service Discovery and Integration", Journal of Universal Computer Science, vol. 20, No. 13 (2014), 1791-1812, 22 pages. (Year: 2014).*

Cheng Zheng et al. "A Study of Intents Resolving for Service Discovery", Proceedings of the 2014 IEEE 18th International Conference on Computer Supported Cooperative Work in Design, 6 pages. (Year: 2014).*

Cheng Zheng et al. "Design and Implementation of Intents User Agent", Proceedings of the 2013 IEEE 17th International Conference on Computer Supported Cooperative Work in Design, 6 pages. (Year: 2013).* w3schools.org. "HTML <input> disabled Attribute", publicly posted Mar. 24, 2015, 6 pages. (Year: 2015).*

The Mozilla Foundation. ":disabled", publicly posted Mar. 21, 2015, 3 pages. (Year: 2015).*

Search Report dated Mar. 11, 2016 for GB Application No. 1513653.5, 7 pages.

Examination Report dated Apr. 4, 2019 for GB Application No. 1513563.5, 4 pages.

* cited by examiner

MANAGING INTERACTION CONSTRAINTS

RELATED APPLICATION

The present application claims priority to GB Application No. 15 13563.5 filed Jul. 31, 2015, which is hereby incorporated herein in its entirety by reference.

TECHNICAL FIELD

The present techniques generally relate to methods for operating an electronic device to configure a subject device, and in particular to an apparatus, systems and methods for configuring and controlling a constrained-resource Internet of Things (IoT) subject device.

BACKGROUND ART

There are ever increasing numbers of devices within the home, office buildings or the outdoor environment that have processing and communication capabilities which allow such devices to interact with other processing devices and cloud services. Everyday objects and relatively small scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; while a healthcare provider may use wireless sensors, such as a heart rate monitor to track the health of patients while they are at home. In the cases described above the data is generally forwarded to a cloud service on the internet.

However, such devices tend to have low processing power and small memory capacity. The devices may lack user interfaces because, for example, of the cost of having a user interface such as a display, or because a display consumes too much power, or because of the physical size of the device itself making it difficult to provide a user interface. The devices may need to be configured in order to connect to the IoT or to other devices/services, but may lack, or have reduced capabilities for, configuration directly on the device.

SUMMARY OF THE INVENTION

The present applicant has recognized the need for an improved way to configure IoT devices.

According to a first aspect of the present technique there is provided a machine-implemented method for operating an electronic device to configure a subject device, the method comprising steps of: receiving an intent from a subject device, wherein the received intent comprises an action identifier identifying an action the subject device wishes to perform; receiving action data about the received intent from an intent store, wherein the action data comprises an action associated with each action identifier, and at least one constraint associated with the action; and generating invocation data to perform the action, wherein the invocation data comprises the action, and zero or more parameters; and passing the invocation data to the endpoint.

In embodiments, the term "zero or more parameters" used herein means zero parameters (i.e. no parameter), one parameter for the or each constraint (which may itself have a zero or null value), two parameters, or a plurality of parameters (i.e. more than one parameter for each constraint).

The endpoint may be the subject device, a second electronic device, or a service, and in embodiments, passing the invocation data comprises transmitting the invocation data to the endpoint. Additionally or alternatively, the endpoint may be the electronic device itself, such that in embodiments, the method comprises passing the invocation data to the electronic device (or a processor, a user interface, a component, the communication module, and/or a data processing module thereof).

According to a second aspect of the present technique there is provided an electronic device for configuring a subject device, the electronic device comprising a communication module configured to: receive an intent broadcast by a subject device, wherein the received intent comprises an action identifier identifying an action the subject device wishes to perform; receive action data about the received intent from an intent store, wherein the intent store comprises an action associated with each action identifier, and at least one constraint associated with each action; and generate invocation data to perform the action, wherein the invocation data comprises the action, and zero or more parameters; and pass the invocation data to the endpoint.

According to a third aspect of the present technique there is provided a subject device configured to broadcast an intent comprising an action identifier identifying an action the subject device wishes to perform; an intent store storing an action associated with each action identifier, and at least one constraint associated with each action; and an electronic device for configuring the subject device, the electronic device comprising a communication module configured to: receive the intent broadcast by the subject device; receive action data about the received intent from the intent store; and generate invocation data to perform the action, wherein the invocation data comprises the action, and zero or more parameters; and pass the invocation data to the endpoint.

According to a fourth aspect of the present technique there is provided an intent registry comprising: a data store for storing a plurality of action data, wherein each of the action data comprises an action associated with an action identifier, and at least one constraint associated with the action; and a communication module configured to: receive a request for action data, wherein the request specifies an action identifier; retrieve the action data for the specified action identifier from the data store; and pass the retrieved action data.

According to a fifth aspect of the present technique there is provided a non-transitory data carrier carrying code which, when implemented on a processor, causes the processor to carry out the method described herein.

According to a sixth aspect of the present technique there is provided a subject device configured to broadcast an intent comprising an action identifier identifying an action the subject device wishes to perform; an intent store storing an action associated with each action identifier, and at least one constraint associated with each action; and an electronic device for configuring the subject device, the electronic device comprising a communication module configured to: receive the intent broadcast by the subject device; receive action data about the received intent from the intent store; and generate invocation data to perform the action, wherein the invocation data comprises the action, and zero or more parameters; and pass the invocation data to an endpoint.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise subcomponents which may take the form of instructions or sequences of instructions at any of the levels of abstraction, from the direct machine instructions of a native instruction set to high-level compiled or interpreted language constructs.

BRIEF DESCRIPTION OF THE DRAWINGS

The techniques are diagrammatically illustrated, by way of example, in the accompanying drawings, in which.

DETAILED DESCRIPTION

Broadly speaking, embodiments of the present technique provide methods for operating an electronic device to configure a subject device. The term 'electronic device' is used interchangeably herein with the terms "envoy device", "computing device", "mobile computing device", and "portable computing device", "smartphone", "mobile device", "laptop", "PC", "computer", "user device", and "tablet". The term 'subject device' is used interchangeably herein with the terms "Internet of Things (IoT) device", "constrained-resource IoT device", "sensor", and "IP-enabled device".

As mentioned above, IoT devices tend to have low processing power and small memory capacity, and therefore, may lack the resources to configure themselves to connect to the IoT or other devices/services. The task of configuring such devices may be passed to a user instead, but many users may not have the time or ability to configure the devices, which may have differing user interfaces, underlying protocols and use different conventions. Furthermore, some IoT devices may not comprise a user interface, or a user interface which is readily accessible by ordinary users, which reduces the ability for a user to configure the IoT devices directly. The IoT devices may lack user interfaces because, for example, of the cost of having a user interface such as a display, or because a display consumes too much power, or because of the physical size of the device itself making it difficult to provide a user interface. In some cases, the IoT devices may not comprise an accessible user interface, or may not be fitted with multiple user interface types, such that the IoT device may not be configurable by people with different disabilities. IoT devices are typically manufactured by multiple different manufacturers, using different operating systems, protocols, and conventions, which makes it difficult for a user to configure different IoT devices in their home/office. Thus, even if an IoT device has a user interface, the user may be required to understand a technical language (e.g. machine language or programming language) in order to configure the device.

Many users possess electronic devices, in the form of PCs, laptops, tablets, smartphones, etc., which have considerable processing power, are able to connect to other devices in an IoT network, cloud-based services and the Internet, and which have display screens that are able to provide a user interface. Thus, the present techniques use such electronic devices to configure IoT devices, in a user-friendly manner.

The embodiments illustrated in FIGS. 1 to 7 provide solutions to the problem of configuring resource-constrained devices. Throughout the following description, like references shall be used to describe like parts and process steps.

Figure 1:
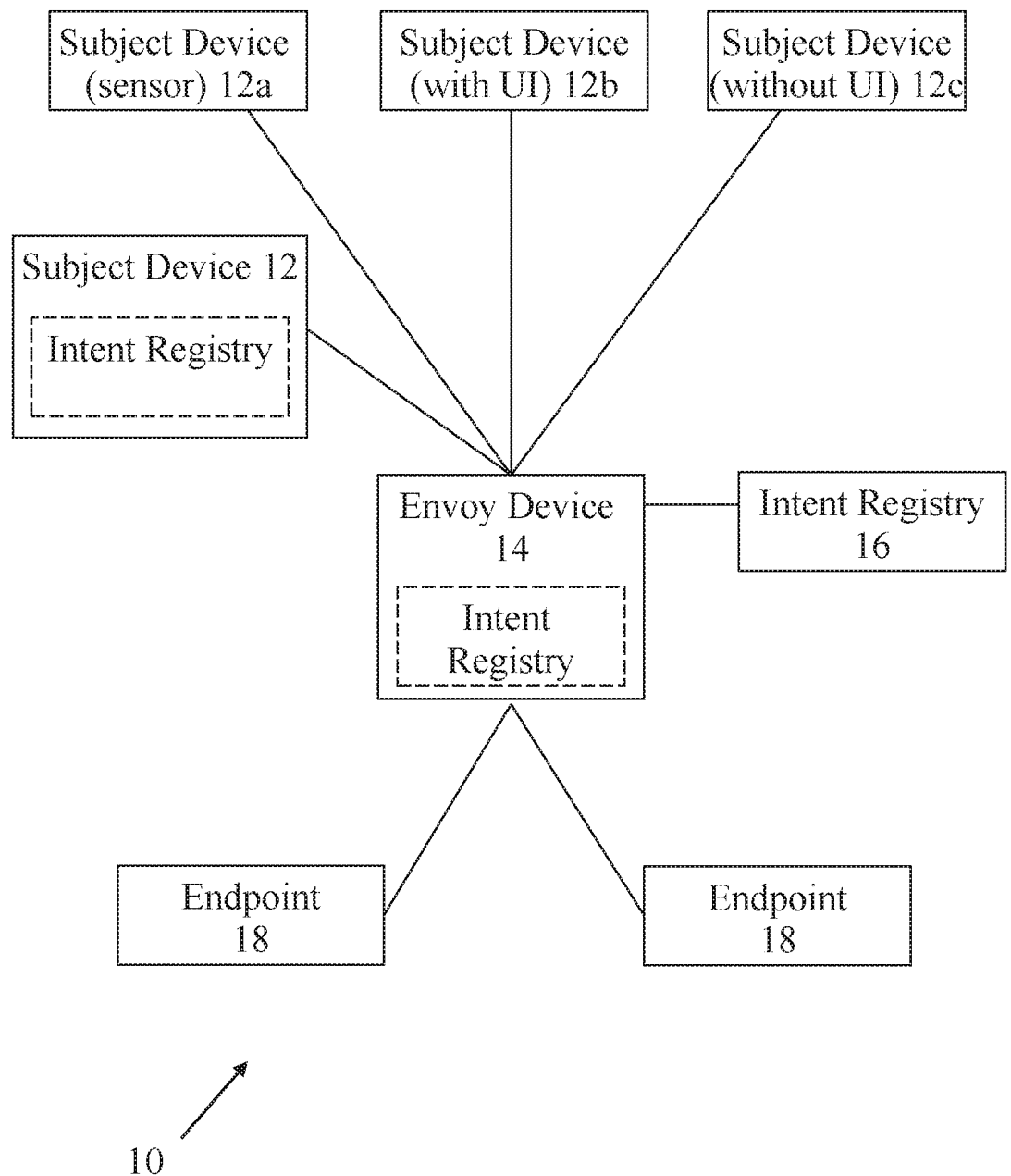
FIG. 1 shows a schematic diagram of a system to operate an envoy device to configure a subject device.

FIG. 1 shows a schematic diagram of a system 10 to operate an envoy device 14 to configure a subject device 12. As mentioned above, an envoy device 14 is a user electronic device which comprises a user interface of some type, and may be a smartphone, PC, laptop, tablet, for example. The user interface of the envoy device 14 may be used to communicate information to a user, and/or for a user to communicate with the envoy device 14. The user interface of the envoy device may be, for example, a visual user interface (e.g. on a display), an audio user interface (e.g. having a microphone and a speaker), a touch-based user interface (e.g. a touch screen, a braille display/terminal, etc.), assistive technology products (e.g. electronic point devices, alternative keyboards, joysticks, sip-and-puff devices, etc.), or a combination of one or more of these example interfaces. In the following description, where reference is made to a user interface being displayed on a display, or to 'displaying' a user interface or 'displaying' data, this is merely used as an illustrative example, and the skilled person will understand that any suitable user interface, apparatus, component, peripheral or technique to enable communication between a user and an envoy device 14 may be used.

The system 10 comprises at least one subject device 12. The subject device may be a sensor 12a, which are installed within homes, offices, vehicles, or other environments, or are located on (or embedded in) a human or animal. The subject device may have a user interface 12b, or may not have a user interface 12c. In embodiments, the system 10 comprises a plurality of subject devices 12a, 12b, and/or 12c.

The or each subject device 12 may be configured to broadcast an intent, which encapsulates an action that a device can perform, contains information that allows an envoy device 14 to determine if it has the permissions to perform the action, and details any parameters the envoy device 14 requires to invoke the action. For example, the intent with action com.arm.connctivity.wifi tells the subject device 12 to connect to a WiFi network and has parameters for the SSID and passcode. In an illustrative embodiment, an intent may contain the following fields:

"action"—a globally namespaced identifier for a type of action. An action ID is associated with a standard set of constraints.

"constraints"—a description of the parameters required for the action, which may comprise constraints on possible values, such as type, minimum value and maximum value.

"authority"—a list of possible authorities that are required to authorize the invocation of the action.

"endpoint"—the address at which the action is to be invoked. This is a URL specifying where the parameters should be sent to make the action being advertised happen.

"URL"—the address at which the intent is being advertised, i.e. of the subject device 12.

"knownParameters"—a list of (possibly partial) parameter sets that might help the envoy device 14 to generate a user interface (UI). These parameter sets provide the user with a fast way to fill out forms with known or pre-entered values.

As subject device 12 may be a constrained-resource device and/or a low-power device, it may be desirable to reduce the amount of information stored within the subject device 12, and/or to reduce the amount of information which needs to be transmitted to and from the subject device 12 over a communications network, which may consume a large amount of power. Thus, in embodiments, the intent comprises an action identifier (action ID) identifying an action the subject device 12 wishes to perform, and optionally, an endpoint address where the action is to be performed. In an embodiment, the endpoint address is the subject device address, and thus, the intent may or may not include the endpoint (subject device) address. For example, if the endpoint is a 'well-known' location on the subject device, then the intent may not include the endpoint address. This also enables the subject device 12 to advertise its presence to nearby envoy devices 14. The intent may be broadcast using any suitable communication protocol, such as Bluetooth® or Bluetooth Low Energy®. The other fields of the intent required to perform the action, such as the constraints, any parameter(s) associated with a constraint and authority, are fetched by the envoy device 14 from an intent registry 16, as described in more detail below. (The terms 'intent registry' and 'intent store' are used interchangeably herein). The envoy device 14 must fetch an action with a matching action or action ID from the intent registry 16. This also promotes the reuse of intents by different subject devices 12.

By way of example only, a common action that a subject device 12 wishes to perform is connection to a WiFi network. This is particularly relevant when setting up a new subject device 12 in a system. In some cases, multiple subject devices 12 of the same type are added to an environment at the same time. For example, dozens or tens of dozens of IoT lights may be installed in an office, and each IoT light requires the same configuration data to enable it to connect to the local WiFi network. This places a large burden on a user, as selecting a WiFi network and entering the WiFi passcode for each IoT light is both time consuming and repetitive. Furthermore, users often struggle to remember the password for each WiFi network, which can slow down the configuration process even more. Further still, if the IoT lights do not comprise a user interface, or a user interface which an ordinary user can understand, then the configuration process is more difficult. In some cases, the IoT lights may display a configuration request (action) on its own user interface, but if this request is in a technical language (e.g. machine language or programming language), then an ordinary user may not understand the request and thereby, will fail to configure the IoT lights.

The present techniques simplifies the process to configure a subject device, by presenting a user with a natural language description of the action that the subject device wishes to perform, on a separate device, i.e. on envoy device 14. Envoy device 14 is described in more detail below.

The system 10 comprises an intent registry 16 (also referred to interchangeably herein as "registry", 'intent store', or "action registry"). The intent registry 16 is configured to store a database of actions, where each action is associated with a unique action identifier ("action ID"). Thus, the intent registry 16 may be a data store or storage medium configured to store the database of actions. The actions and action identifiers may be pre-registered in the intent registry 16 upon request from third party manufacturers and service providers. For example, a manufacturer of subject device 12 requests an action to be stored in the intent registry. By way of example only, a manufacturer of an IoT light requests an action relating to connecting the IoT light to a WiFi network to be stored in the intent registry 16. The manufacturer specifies one or more constraints associated with the action. In this example case, there are at least two constraints: 1) "SSID" or "WiFi network name", and 2) passcode or key. The constraints specify the data required in order to perform the action. That is, the IoT light requires the name of a WiFi network and the passcode associated with that network name, in order for it to connect to the network (i.e. perform the action). The intent registry 16 stores the actions and/or constraints in natural language, so that a human user can understand them. Thus, the intent registry comprises an action associated with each pre-registered action identifier, and at least one constraint associated with each action.

In embodiments, the intent registry 16 is a centralized repository that serves one or more constraints (also referred to herein as "a constraint set" or "action data") for an associated intent. For example, the intent registry 16 serves action data which describes the SSID and password fields for connecting to a WiFi network when queried for a particular action ID. The intent registry 16 may be configured to handle the localization of tiles and descriptions for properties, a task that would otherwise be left to the subject devices or envoy devices. The intent registry 16 stores an action data for each action, which avoids duplication and complicating the user experience. In the case of the action for connecting to a WiFi network, there is a single action ID and action data in the intent registry 16. Different manufacturers of subject devices 12 can configure their subject devices to output the same, single, unique action ID when they wish to connect to a WiFi network. The subject device may not know what action is associated with each action ID, such that a user cannot necessarily determine from the action ID broadcast by the subject device what action the subject device wishes to perform.

In FIG. 1, the intent registry 16 is illustrated as being remote to the subject device 12 and the envoy device 14. Thus, the step of receiving action data about a received intent comprises receiving the action data (being served the action data) from a remote intent registry. However, this is merely an illustrative embodiment. In additional or alternative embodiments, the intent registry 16 may be provided as a local copy/mirror of a remote intent registry, which is stored on the envoy device 14. (The local intent registry may be provided as a dedicated data store/storage medium within the envoy device 14, or may be part of the data store/storage medium of the envoy device 14.) This may enable the envoy device 14 to store action data for all or a subset of action IDs, which may improve the efficiency to receive action data for a particular action ID in the received intent. It may also enable subject device 12 configuration when the envoy device 14 is unable to communicate with the remote intent registry 16 (e.g. due a fault in the communication channel). Thus, the system 10 may comprise a local copy of the intent registry 16 on the envoy device 14, such that the step of receiving action data about the received intent comprises retrieving the action data from the local copy of the intent registry.

In a further additional or alternative embodiment, the subject device 12 itself may provide action data. The subject device 12 may store such action data for one or more action IDs, and may be configured to provide the action data by default or when the envoy device 14 is unable to receive the action data from a remote intent registry (or from an internal local copy of the intent registry). The subject device intent registry may be provided as a dedicated data store/storage medium within the subject device 12, or may be part of the data store/storage medium of the envoy device 14. Thus, the step of receiving action data about the received intent may comprise receiving the action data from a subject device intent registry.

The system 10 comprises at least one envoy device 14 which is operable to configure a subject device 12. The envoy device 14 is an electronic device, and in embodiments may be any one of the following types of electronic device: mobile phone, smartphone, PC, workstation, laptop, smartwatch, embedded device, or tablet computer. An 'envoy application' (software application, or 'app') may be installed on the envoy device 14, which enables the envoy device to configure a subject device. The or each envoy device 14 may be operable to configure one or more subject devices 12. The envoy device 14 comprises a communication module configured to: receive the intent broadcast by the subject device 12; receive action data about the received intent from the intent registry 16; generate invocation data to perform the action, wherein the invocation data comprises the action, and zero or more parameters; and optionally, transmit the invocation data.

As mentioned above, the envoy device 14 receives zero or more parameters for the or each constraint associated with the action. The term "zero or more parameters" used herein means zero parameters (i.e. no parameter), one parameter for the or each constraint (which may itself have a zero or null value), two parameters, three, parameters, etc., or a plurality of parameters (i.e. more than one parameter for each constraint). In an embodiment, the envoy device 14 receives zero/no parameters for a constraint. For example, an action may be to "open a door". In this example case, the action does not necessarily require customization—the door simply needs to be opened (or stay closed). Thus, in this case, the constraint associated with the action may be communicated to a user of the envoy device 14 (via the communication module), but no further prompt to customize parameters corresponding to the constraint is provided.

In embodiments, there may be multiple types of parameter values. A "default value" for a parameter is the initial value for a particular parameter. The default value may be stored in the intent registry 16 (which may be a remote intent registry, and/or a local intent registry on the envoy device 14). A "known value" for a parameter is a value obtained from or derived from a previous invocation of an action. A "subject-supplied value" is a known value for a parameter that is supplied by the subject device 12 itself. An example illustrating how these different types of parameter values may be used is now provided.

A subject device 12 may be an IoT device configured to control the running of a bath. The IoT device may comprise multiple sensors to enable this function. For example, the subject device 12 may control the temperature of the water that flows into a bathtub, and may also control the volume or depth of the water in the bathtub. The first time this subject device 12 is used, the envoy device 14 receives an intent having an action ID from the subject device. The envoy device 14 fetches the one or more constraints corresponding to the action ID from the (remote) intent registry 16, and parameter values associated with the parameters of each constraint from the intent registry 16. The received parameter values may include a default value for each parameter. For example, a constraint associated with the action ID may be to "set a temperature for the water". A parameter for this constraint enables the constraint to be configured. The default value for this parameter may be, for example, 38° C. Similarly, another constraint associated with the action ID may be to "set a depth for the water", and the default value for the associated parameter may be 30 centimeters. There may be a single default value for each parameter. This default value may be set by the manufacturer of the IoT device when the action and action ID are stored in the intent registry 16. The default values of the parameters are supplied by the intent registry 16 to the envoy device 14, and in embodiments, are independent from each other.

A user of this example bath-controlling subject device 12 may run baths for different people in their household, such as themselves and their young children. The parameter values for each of the above-mentioned constraints may vary for the adult and the children. For example, the temperature of the bath water may be cooler for the children than the adult, and the depth of the water in the bathtub may be higher for the adult than the children. Thus, a user of the subject device 12 may have configured the subject device 12 in different ways depending on who the bath is run for. For example, the user may have set the temperature to be 40° C. for an adult in the past, and set the temperature to be 36° C. for a child. These values are stored in the envoy device 14 as "known values" for the temperature parameter. Thus, the envoy device 14 may be configured to communicate the known values to the user of the envoy device 14 and prompt them to select, modify or reject the known values.

If the user selects one of the known values, the envoy device 14 may be further configured to communicate known values of water depth to the user. For example, if the user has set the temperature to be 40° C. and the depth to be 40 centimeters in the past, then if the user selects the 40° C. known parameter value, the envoy device 14 is configured to suggest the depth of 40 centimeters (as this is the associated known value for the depth). Combinations of these known values may be stored in the envoy device with names to enable quick access to previously-used configuration settings, such as "warm and deep", or "lukewarm and shallow". The use of known values may enable the speed and efficiency of subject device 12 configuration to be improved. Two or more known parameters may be associated with each other and stored as groups (e.g. temperature and depth). These groupings may be considered atomic parameter sets.

The subject-supplied parameter values may enable a subject device 12 to suggest known parameters to the envoy device 14, which the envoy device 14 may communicate to the user in addition to any other parameter values (default and/or known) it has obtained/retrieved. For example, in the above-mentioned example of an action to connect to a WiFi network, the subject device 12 may provide the envoy device 14 with a list of the WiFi networks it can see at the time of broadcasting the intent. The WiFi network names sent to the envoy device 14 are subject-supplied parameter values for the WiFi name (SSID) constraint. The envoy device 14 communicates these WiFi network names to a user via a user interface, and thus, the parameter values for the WiFi connection action are partially completed. The envoy device 14 may combine the subject-supplied parameter values with known parameter values (i.e. WiFi networks that have previously been used). If a known WiFi network is selected, the envoy device 14 may be prompted to fetch the associated passcode (i.e. the corresponding known parameter value for the passcode) for the WiFi network from a data store. The subject-supplied parameter values and the known parameter values may be combined/merged such that the envoy device 14 communicates the parameter values to a user as a merged list/set of options.

A further illustrative example of the different parameter value types is now discussed. A subject device 12 may be a smart lighting device (or light bulb) that can be configured to emit different colors of light. The smart light can be configured by a user to emit different colors of light, and thus, the action may be to "configure multi-colored light". If a user has the smart lighting device in their home, the user will likely have configured the smart lighting device to emit their favorite colors. The favorite colors are saved by the envoy device 14 as known parameter values for the "color" constraint. (Other constraints associated with this action may be time of day, time to emit the color, when to change the color, when to turn on/off, etc.). However, the smart lighting device may also be installed in a hotel, and the hotel may enable the user (hotel guest) to configure the smart lighting device in their hotel room. The hotel may have configured the subject device 12 with particular settings— e.g. a few colors that match the décor of the hotel room. These settings are subject-device specific, as they are configured by the hotel and not based on the default value in the intent registry. (A default value for the color may be "off-white", for example). When a user enters their hotel room, their envoy device 14 may receive the subject-supplied parameter values for the color from the smart lighting device (as pre-set by the hotel), and may combine these with the user's own saved known parameter values, and present these to the user as a single list of parameter options.

The communication module of the envoy device 14 may be configured to search for or listen out for intent broadcasts from subject devices 12 in its vicinity. In embodiments, the envoy application installed on the envoy device 14 may be used to receive intent broadcasts from subject devices 12. In embodiments, the communication module may be configured to listen for intent broadcasts using the Bluetooth® or Bluetooth Low Energy® communication protocol. When the envoy device 14 receives an intent broadcast from a subject device 12, the envoy device communicates with the intent registry 16 to determine the action from the action ID contained within the received intent. The intent registry 16 returns action data, comprising the action associated with the action ID and one or more constraints associated with the action. The envoy device 14 may be configured to prompt the user of the envoy device 14 to configure the subject device 12. In embodiments, the envoy device 14 prompts the user to input parameters for the one or more constraints, and uses the natural language description of the action and/or constraints to communicate with the user.

Once the parameters are received by the envoy device 14, the envoy device 14 generates invocation data to enable the action to be performed. This invocation data comprises information on the action to be performed, the one or more constraints, and the one or more parameters for each constraint. The invocation data may be sent by the envoy data 14 to the endpoint which is to perform the action, as specified in the intent received from the subject device 12. In embodiments, the endpoint may be the subject device 12 itself. For example, if the subject device 12 wishes to connect to a WiFi network, then the invocation data (comprising the SSID of a particular WiFi network and the associated passcode), is transmitted to the subject device 12 which sent the intent. Additionally or alternatively, the intent can specify a different endpoint 18, or multiple endpoints 18. An example of this embodiment is described in more detail below with reference to FIG. 6.

Figure 7:
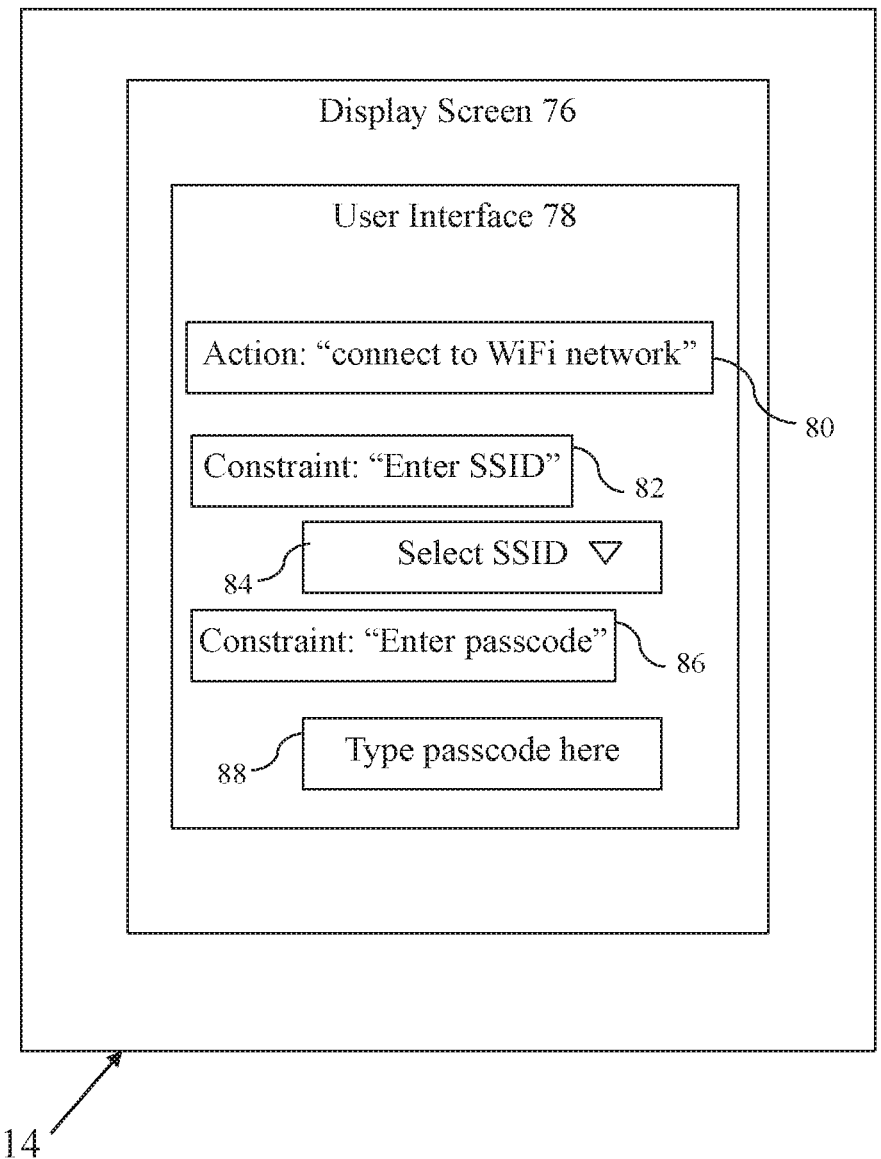
FIG. 7 shows a schematic diagram of an envoy device for configuring a subject device.

In embodiments, the envoy device 14 comprises a display screen. The envoy device 14 (via the communication module, a processor, or otherwise) may be configured to generate a user interface for display on the display screen; and provide the one or more received parameters on the user interface on the display screen, whereby a user is able to select, reject or modify the or each of the parameters. Turning to FIG. 7, this shows a schematic diagram of an envoy device 14. The envoy device 14 comprises a display screen 76, which may be a touch-sensitive display screen. The envoy device 14 generates and displays a user interface 78 on the display screen 76, to enable a user of the envoy device 14 to configure a subject device 12. The envoy device 14 displays the natural language description 80 of an action associated with a particular action ID, which may be retrieved from the intent registry 16. In the illustrated, non-limiting example, the natural language description 80 for the action ID is "connect to WiFi network", which the user readily understands to mean that the subject device 12 wishes to connect to a WiFi network.

The action data received by the envoy device 14 from the intent registry 16 also comprises one or more constraints for the action, in natural language format. In this illustrated example, constraint 82 requests the user to "Enter SSID", which the user understands to mean that he needs to enter or select the SSID of a WiFi network. The WiFi network needs to be visible to the subject device 12, so the subject device 12 provides the envoy device 14 with one or more values for the SSID, based on those WiFi networks it can see. Thus, the subject device 12 provides subject-supplied parameter values to the envoy device 14. This may reduce or avoid the need to perform this type of subject device configuration in the vicinity of the subject device, or with prior knowledge of the nearby WiFi network(s) that the subject device 12 can connect to, since information about the WiFi networks is provided by the subject device 12 itself. Constraint 82 prompts a user to enter or select the SSID of a WiFi network via the user interface 78. The communication module of the envoy device 14 may be configured to include a free-text box on the user interface 78, whereby a user can type in a parameter for a constraint, or a drop-down list, whereby a user can select a parameter, or a similar means for a user to input a parameter. In the illustrated example, the user interface 78 comprises a drop-down list 84 to "Select SSID" from a list provided by the envoy device 14. The envoy device 14 may display the names of the WiFi networks in its vicinity in the drop-down list 84, as detected by the communication module of the envoy device 14.

Constraint 86 prompts a user to enter the passcode for the selected WiFi network. Here, the user interface provides a free-text box 88 for a user to type in the passcode associated with the selected WiFi network. Once the user has entered parameters for the action 80, the envoy device 14 may be configured to generate the invocation data to perform the action and transmit the invocation data to the endpoint specified in the intent.

In the WiFi example shown in FIG. 7, the envoy device 14 may be configured to display the constraints in a priority order. In this example, the SSID is required before a passcode can be input. Thus, the SSID constraint 82 is displayed above the passcode constraint 86, so that the user knows to enter the parameter for constraint 82 before constraint 86. In embodiments, the user interface may only display the second constraint 86 once a parameter has been entered for the first constraint 82.

Thus, in embodiments, the communication module of the envoy device 14 receives at least two constraints for an action, and is further configured to: determine a priority order for the at least two constraints, and configure the user interface such that the constraints are displayed in the determined priority order. The priority order may be specified in the action data received from the intent registry 16.

In embodiments, the subject device 12 may be a constrained-resource Internet of Things (IoT) device.

In embodiments, the envoy (electronic) device 14 may be a portable computing device, smartphone, smartwatch, or embedded device.

In embodiments, the communication module of the envoy device 14 may be configured to communicate with the or each subject device 12 and the intent registry 16 using one or more of a local area network, a wireless local area network (WiFi), Bluetooth, Bluetooth Low Energy, or a mobile network.

In embodiments, the intent registry 16 may be provided as a hardware device located remote to the subject device 12 and the envoy device 14. Additionally or alternatively, the intent registry 16 may be provided as a cloud service.

In embodiments of the system, the communication module of the electronic device may be configured to receive at least one parameter for the or each constraint associated with the action. The communication module of the electronic device may be configured to communicate the at least one constraint and the or each received parameter to a user to select, reject or modify the or each parameter for each constraint.

In embodiments of the system, the subject device may be a constrained-resource Internet of Things (IoT) device. In embodiments, the subject device may be a portable computing device, smartphone, smartwatch, or embedded device.

In embodiments of the system, the electronic device may be a portable computing device, smartphone, smartwatch, or embedded device.

In embodiments of the system, the communication module of the electronic device may be configured to communicate with the subject device and the intent store using one or more of a local area network, a wireless local area network (WiFi), Bluetooth, Bluetooth Low Energy, or a mobile network.

In embodiments of the system, the intent store may be provided as a hardware device located remote to the subject device and the electronic device. In embodiments, the intent store may be provided as a cloud service.

In embodiments of the system, the communication module of the electronic device may receive and locally store the intent store on the electronic device, and wherein the communication module may be configured to retrieve the action data from the local copy of the intent store. In embodiments, the communication module of the electronic device may receive the action data from a subject device intent store.

Figure 2:
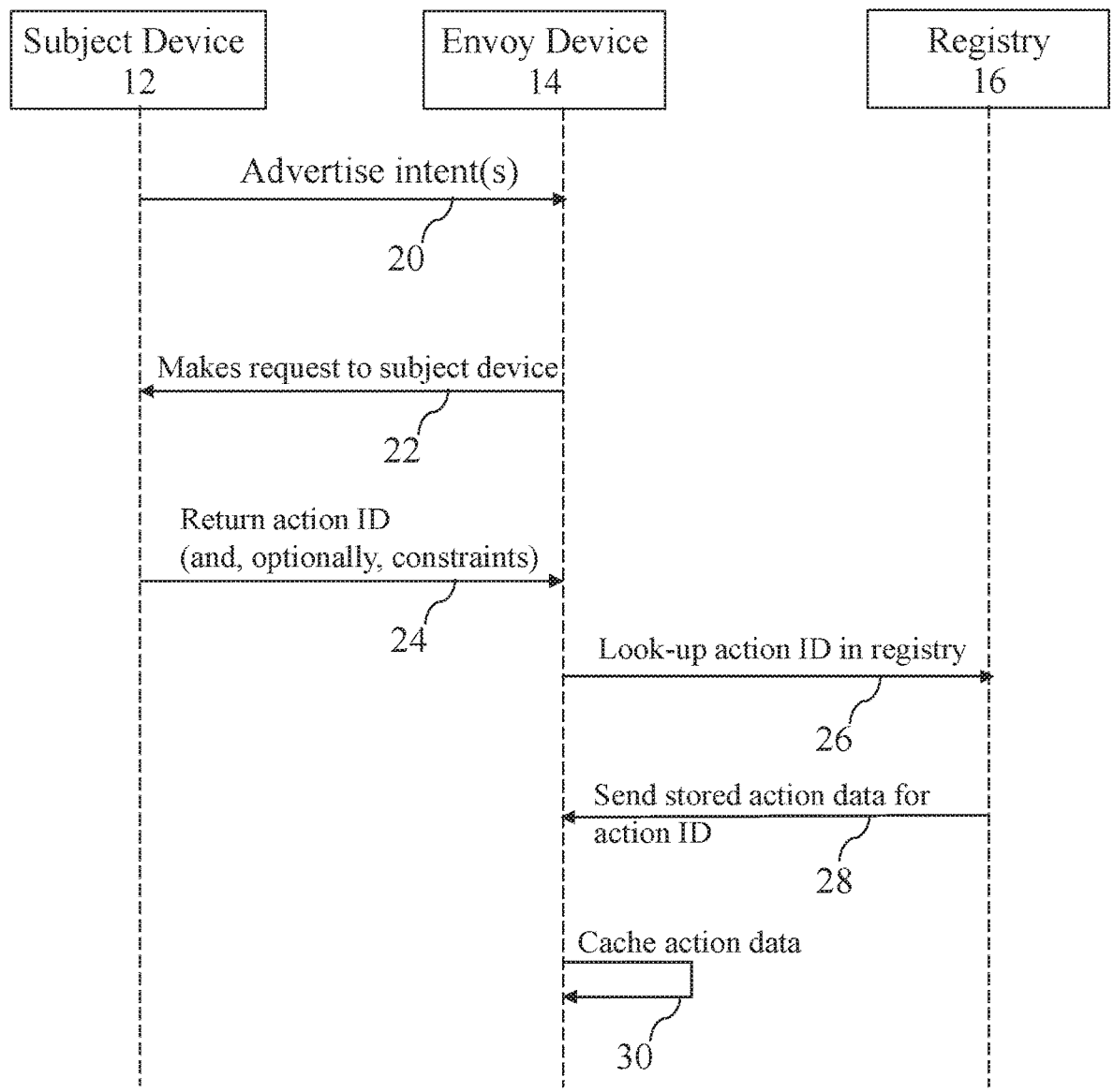
FIG. 2 shows a schematic diagram of the steps to determine how the subject device may be configured.

Turning to FIG. 2, this shows a schematic diagram of the steps to determine how a subject device 12 may be configured. The subject device 12 advertises an intent (step 20) which indicates the action the subject device 12 wishes to perform and an endpoint address where the action is to be performed. As mentioned above, the intent may not comprise all the information required to perform the action, to reduce the amount of information stored in the subject device 12. Thus, the envoy device (electronic device) 14 receives the advertised intent and requests further information from the subject device 12 if it is interested in invoking the action on behalf of the subject device 12 (step 22). The subject device 12 returns an action ID for the intent (step 24), which enables the envoy device 14 to fetch the missing information from intent registry 16. Optionally, the subject device 12 may also send one or more constraints with the action ID. In embodiments, the subject device 12 may provide subject-supplied parameter values for the or each constraint, as explained above. A "subject-supplied value" is a known value for a parameter that is supplied by the subject device 12 itself. In embodiments, the envoy device 14 fetches any further constraints from the intent registry 16, and combines the fetched constraints with those in the intent.

The envoy device 14 requests action data related to the received action ID from the intent registry 16 (step 26). The intent registry may be configured to look up the action ID in the data store of the registry and retrieve the stored action data associated with the action ID. The retrieved stored action data may be transmitted to the envoy device 14 (step 28). In embodiments, the intent registry 16 may be located remote to the envoy device 14, as mentioned above, and thus, the action data may be transmitted to the envoy device 14 from the subject device intent registry of the subject device 12 or from a remote intent registry. In an embodiment, the envoy device 14 comprises its own local copy of an intent registry, and thus, the action data may be passed to the envoy device 14 internally (e.g. from the local intent registry to the communication module of the envoy device). In embodiments, the envoy device 14 caches the received action data associated with the action ID (step 30). Caching the action data for an action ID enables the envoy device 14 to configure other subject devices 12 that broadcast an intent for the same action more efficiently. This also enables an envoy device 14 to configure subject devices 12 when it is temporarily unable to communicate with the intent registry 16.

Figure 3:
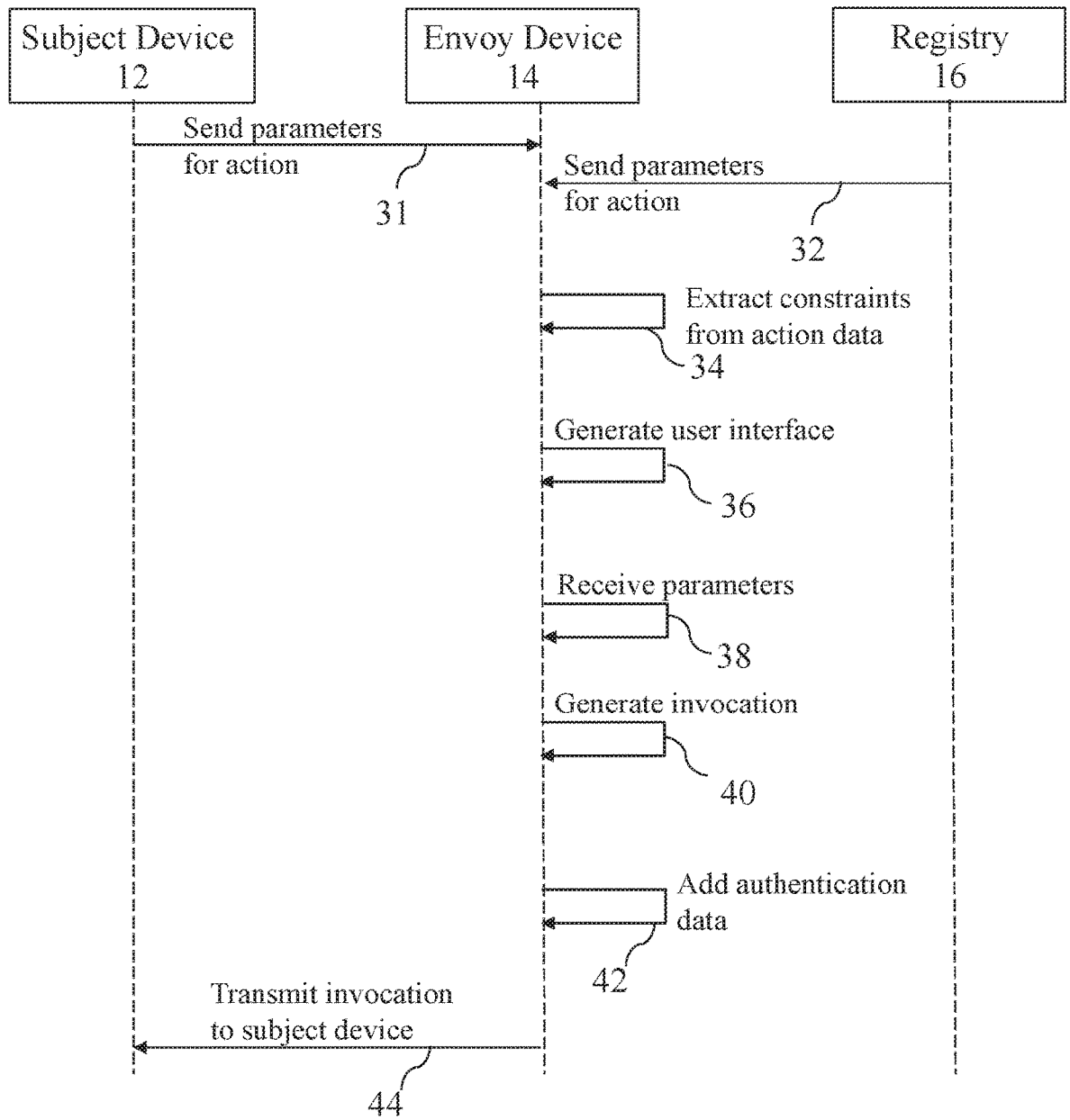
FIG. 3 shows a schematic diagram of the steps to operate an envoy device to configure a subject device to perform an action.

FIG. 3 shows a schematic diagram of the steps to operate an envoy device 14 to configure a subject device 12 to perform an action. Once an envoy device 14 has decided to invoke an action in an intent received from the subject device 12, the envoy device 14 may be configured to present a user with a prompt for the required parameters to perform the action. In embodiments, the intent registry 16 comprises one or more default parameters for an action, which are transmitted to the envoy device 14 in the action data. As mentioned above, the central, remote intent registry 16 may comprise a single default value for each parameter. This default value may be set by the manufacturer of the subject device 12 when the action and action ID were stored in the intent registry 16. The default values of the parameters are supplied by the intent registry 16 to the envoy device 14 (step 32). Additionally or alternatively, the subject device 12 may provide one or more subject-supplied parameters to the envoy device (step 31). The subject-supplied parameters may be provided to the envoy device in the intent broadcast by the subject device 12, or may be provided upon request from the envoy device 14, or may be provided when the subject device 12 receives an indication that the envoy device intends to invoke an action. Additionally or alternatively, if the envoy device 14 has previously invoked the same action, the parameter(s) for the or each constraint may be fetched from the envoy device itself (e.g. from a data store, the local intent registry, a storage medium, etc.).

By way of example, if the action concerns making a payment, one of the constraints associated with the action may be to specify a currency for the payment, and the default parameters comprise a list of popular currency types (e.g. GBP, USD, EUR). The envoy device 14 may be configured to, for example, present the default currency types to the user and prompt the user to select a specific currency, or to enter an alternative currency. In embodiments, the envoy device 14 stores the user's parameter selection as a 'known parameter' which can be provided to the user for selection/rejection/editing the next time the same action is invoked. Thus, in embodiments, the envoy device 14 receives one or more parameters for an action (step 32).

The envoy device 14 extracts the constraints from the action data received from the intent registry 16 (step 34) to determine what information to present to the user. The envoy device 14 is configured to, in embodiments, determine a priority order for the constraints, and to present the information to the user in the priority order, as described above. The envoy device 14 generates a graphical user interface (step 36) to present the constraints to the user of the envoy device and to prompt the user for the required parameters. In embodiments, the envoy device 14 configures the communication module to communicate the constraints to the user in any suitable manner, e.g. via a graphical user interface on a display, an audio signal, a braille display, etc. The communication module of the envoy device 14 may be configured to receive the parameters (step 38). In embodiments, the user inputs the parameters into the envoy device 14 via the user interface. The envoy device 14 generates invocation data, which encapsulates the parameters that the endpoint specified in the intent should use for performing the action (step 40). In embodiments, the invocation data provides some evidence that the envoy device 14 has permission to/is authorized to perform the action on behalf of the subject device 12. Thus, in embodiments, the envoy device 14 adds authentication data to the generated invocation to confirm that it is authorized to perform the action (step 42). Alternatively or additionally, the envoy device 14 may be configured to invoke actions only if it has already received an authorization or permission to perform the action. If the envoy device 14 does not have the required authorization, it does not (or cannot) invoke the action. The invocation process may in embodiments only be performed in the authorization has been received, and thus, the step of adding authentication may not be required. In embodiments, the step of adding authentication data may confirm that the envoy device 14 has the required authorization. The generated invocation may be then transmitted to the endpoint (step 44). In the illustrated embodiment, the endpoint specified in the intent may be the subject device, so the envoy device 14 transmits the invocation to the subject device 12. As mentioned above, the intent may not specify an endpoint address—this may be derived from the type of action being performed, or may be a well-known endpoint which does not need to be specified in the intent.

Thus, the present techniques provide a machine-implemented method for operating an electronic device 14 to configure a subject device 12, the method comprising steps of: receiving an intent from a subject device 12, wherein the received intent comprises an action identifier identifying an action the subject device 12 wishes to perform; receiving action data about the received intent from an intent registry 16, wherein the action data comprises an action associated with each action identifier, and at least one constraint associated with the action; and generating invocation data to perform the action, wherein the invocation data comprises the action identifier, and zero or more parameters.

In embodiments, the step of receiving an intent comprises receiving at least one endpoint address indicating where the action is to be performed. The method may further comprise extracting the or each endpoint address from the received intent; and transmitting the invocation data to the or each endpoint address specified in the received intent. In embodiments, extracting the or each endpoint address from the received intent comprises identifying a uniform resource locator (URL), host name, IPv6 address and/or an IPv4 address in the received intent.

Additionally or alternatively, the endpoint address may not be specified within the intent. For example, if the endpoint is a 'well-known' location on the subject device (or on an envoy device), then the intent may not include the endpoint address. Thus, in embodiments, the method comprises determining at least one endpoint address from the received intent (based on, for example, the action being performed), wherein the or each determined endpoint address specifies where the action is to be performed, and transmitting (passing) the invocation data to the or each determined endpoint address.

In embodiments, the invocation data may be sent to more than one endpoint. For example, there may be a primary target/endpoint for the invocation (which is where the action is to be performed) and a secondary endpoint which is 'copied in' on the invocation data sent to the primary endpoint. This is described in more detail below with reference to FIG. 6. Thus, in embodiments, the endpoint address comprises a primary endpoint and a secondary endpoint, and wherein the step of transmitting the invocation data comprises sending the invocation data to both the primary and second endpoints. The invocation data may be forwarded to the primary endpoint by the secondary endpoint, when the communication channel between the primary endpoint and envoy device is faulty, or as a backup even when the communication channel between the primary endpoint and envoy device is operational. In particular embodiments, the method further comprises receiving an indication that transmission of the invocation data to the primary endpoint has failed and re-transmitting the invocation data to the primary endpoint. Thus, the envoy device 14 may attempt to retransmit the invocation data if it receives an indication that its previous attempt has failed. In some cases (e.g. for particular actions, or by default for all actions), the secondary endpoint may be configured to forward the invocation data to the primary endpoint if the envoy device indicates that its communication channel to the primary endpoint is faulty, or by default as a back-up.

Figure 4:
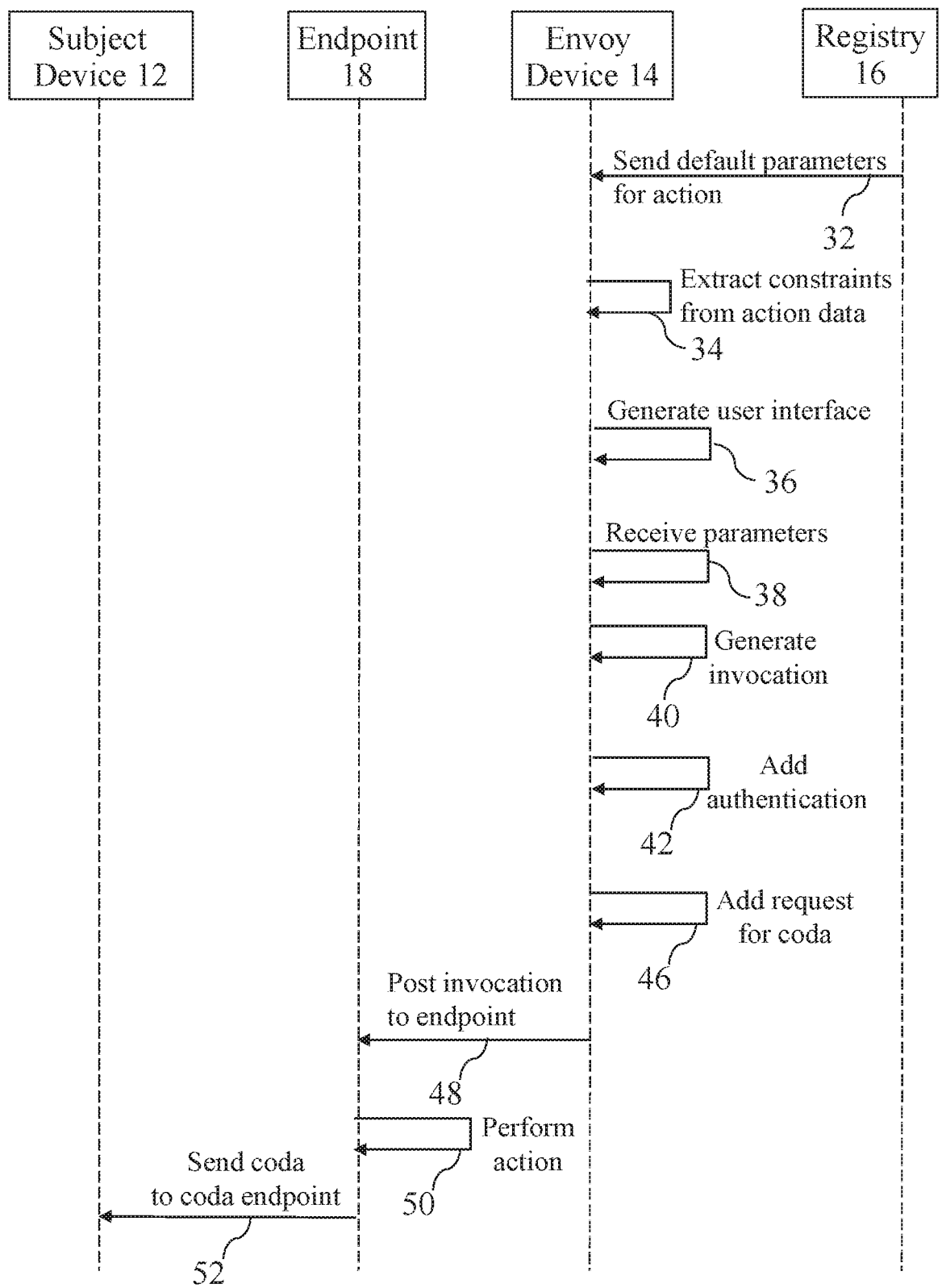
FIG. 4 shows a schematic diagram of the steps to operate an envoy device to configure an endpoint to perform an action.

FIG. 4 shows a schematic diagram of the steps to operate an envoy device 14 to configure an endpoint 18 to perform an action. In this embodiment, the endpoint specified in the intent broadcast by the subject device 12 (or derived from the intent) is not the subject device 12 itself, but is a different endpoint device or service. Steps 31 to 42 in FIG. 4 are the same as those described above with reference to FIG. 3. In the embodiment of FIG. 4, the envoy device 46 is configured to add a request for a coda in to the generated invocation (step 46), and a coda address to which the coda is to be sent. A coda is a receipt confirming that an action has been performed. The request for a coda may be provided within the intent broadcast by the subject device 12, and/or may be provided within the action data, as certain actions may require a coda by default. The envoy device 14 transmits the invocation to the endpoint 18 specified in the intent (step 48). The endpoint 18 performs the action specified in the invocation (step 50), and sends a coda to the coda address (step 52). In the illustrated process, the coda is sent to the subject device 12. In embodiments, the coda is sent to the envoy device 14 instead or in addition to the subject device 12.

In embodiments of the machine-implemented method, the method may comprise receiving at least one parameter for the or each constraint associated with the action.

As explained earlier, the or each parameter may be a default parameter and the step of receiving the at least one parameter comprises receiving the default parameter from the intent registry. For example, one or more parameters are received from the intent registry 16, which stores the default parameters in association with a particular action ID. The parameters may be default values, as described above. Additionally or alternatively, the or each parameter is a predetermined (known) parameter, and wherein the step of receiving the at least one parameter comprises retrieving the predetermined (known) parameter from the electronic (envoy) device 14. The predetermined parameter type is described in more detail above. The predetermined parameter is based on previous parameters that a user has defined for the constraint and which are stored locally within the envoy device 14. Additionally or alternatively, the or each parameter is a subject-supplied parameter, wherein the step of receiving the at least one parameter comprises receiving the subject-supplied parameter from the subject device. As explained earlier with reference to the WiFi action, these subject-supplied parameters are provided by the subject device. The one or more parameters are communicated to the user to select, reject or modify the or each of the parameters. The parameters received from the subject device 12 and retrieved from the envoy device 14 may be combined and provided to the user as a single set of options. Thus, the envoy device 14 is configured to at least partially complete the parameters with the default, known or subject-supplied parameter values.

In embodiments, the communication module of the envoy device 14 may be configured to configure a user interface on the electronic device to communicate the at least one constraint to a user, and to receive the or each parameter for each constraint.

In an illustrative embodiment, the step of configuring the user interface comprises generating a graphical user interface (GUI) (step 36 in FIG. 4) for display on the electronic device, wherein the displayed graphical user interface comprises at least one component adapted to capture the or each parameter for each constraint. The at least one component may be a free-text box, drop-down list, or similar means to capture a parameter. Additionally or alternatively, the step of configuring the user interface comprises communicating the at least one constraint as an audio signal.

In embodiments, action comprises at least two constraints, and the method further comprises: determining a priority order for the at least two constraints, and communicating the constraints to a user in the determined priority order.

In embodiments, the step of passing the invocation data to the endpoint address comprises sending the invocation data to the subject device 12 which broadcast the intent. Additionally or alternatively, the invocation data may be sent to an endpoint 18 device or service.

In embodiments, the step of generating invocation data comprises including a request for a receipt (a coda) confirming that the action has been performed, and at least one address to which to send the receipt. As mentioned above, the receipt or coda may be sent to one or more of the subject device 12, the envoy device 14, a third party service, or a third party device. Thus, in embodiments, the envoy device 14 may be configured to receive the receipt confirming that the action has been performed. The envoy device 14 may be configured to resend the invocation data to the endpoint if it does not receive a receipt from the endpoint.

In embodiments, the step of receiving an intent broadcast comprises receiving a uniform resource locator (URL) of the subject device 12, which enables the envoy device 14 to communicate with the subject device 12.

In embodiments, the method may comprise receiving at least one authorization indicating that the electronic device is authorized to generate the invocation data for one or more intents. In a particular embodiment, the method comprises determining if one of the received authorizations is for the received intent; and generating the invocation data if the authorization has been received for the received intent. Thus, authorization for an envoy device 14 to invoke an action is generally received by the envoy device 14 in a separate communication to the intent broadcast by the subject device 12. For example, a user may give a family member the permission to open the front door of the user's house. This permission/authorization is sent to the envoy device 14 owned by the family member. When the family member visits the user's house and sees the door, the can use their envoy device 14 to open the front door because they have already received permission to do so. Thus, in embodiments, the envoy device 14 filters received intents on the basis that it does not have permission to invoke the actions specified by the intents.

In embodiments, the envoy device may be configured to store or temporarily cache the zero or more parameters for each constraint. This enables the envoy device 14 to configure other subject devices 12 which wish to perform the same action more efficiently. In embodiments, the stored parameters provide some or all of the parameters for at least one constraint.

In embodiments, the step of transmitting the invocation data to the endpoint address specified in the received intent comprises: extracting the endpoint address from the received intent, wherein the endpoint address comprises a uniform resource locator (URL), host name, IPv6 address and/or an IPv4 address; and transmitting the invocation data to the extracted endpoint address.

As mentioned above, the intent registry (intent store) may be provided as a remote intent registry, a local copy of a remote intent registry in the envoy device 14, and/or as a subject device intent registry. In embodiments, the step of receiving action data about the received intent comprises receiving the action data from a remote intent registry, the local copy of the intent registry, and/or from the subject device intent registry. The envoy device 14 (or the communication module thereof) may be configured to combine the action data received from one or more intent registries and communicate them to a user as a single set of options.

Generally speaking, the natural language description of each action, the constraints for each action and the parameters for each constrain are considered types of meta-data, since they describe how the envoy device 14 should treat the data it receives. A further example of meta-data used in embodiments of the present techniques may be a flag or other indicator which indicates to the envoy device 14 that it should save the parameter in the envoy device 14 for future use. For example, if a user provides the envoy device 14 with a WiFi password, a flag associated with the password parameter indicates to the envoy device 14 that the password should be saved with the network name. Not all types of parameters may need to be saved, as some parameters may be a one-time-only parameter (e.g. a comment in a 'leave a comment box', or where a WiFi password for a particular network has an expiry date).

Thus, in embodiments, the step of receiving at least one parameter for the or each constraint associated with the action may comprise receiving a 'save flag' (or other indicator) for the or each parameter indicating that the parameter is to be saved on the electronic device.

Another example of meta-data used in embodiments of the present techniques is a 'uniqueness' flag or other indicator, which indicates to the envoy device 14 that the parameter value is unique and should replace any old stored parameter values. For example, if a WiFi password has changed, a user communicates the new password to the envoy device. A 'uniqueness' or 'replace' flag is associated with the SSID network parameter, which indicates to the envoy device 14 that the newly-received password for this SSID/WiFi network should be saved and should replace any old version of the password stored in the envoy device.

Thus, in embodiments, the step of receiving at least one parameter for the or each constraint associated with the action comprises receiving a replace flag for the or each parameter requiring the parameter to be saved and to replace an existing parameter.

An aspect of the present techniques provides an electronic device 14 for configuring a subject device 12, the electronic device 14 comprising a communication module configured to: receive an intent broadcast by a subject device 12, wherein the received intent comprises an action identifier identifying an action the subject device 12 wishes to perform; receive action data about the received intent from an intent registry 16, wherein the intent registry 16 comprises an action associated with each action identifier, and at least one constraint associated with each action; generate invocation data to perform the action, wherein the invocation data comprises the action, and zero or more parameters; and pass the invocation data to an endpoint.

The communication module may be part of an existing communication module of the electronic device 14, or may be provided as an additional feature built into the electronic device 14. Additionally or alternatively, the communication module may be formed from various components of an electronic device 14. The communication module may comprise at least one processor which may be a dedicated processor for the communication module or may be shared with other components of the electronic device 14. The communication module may comprise an input and an output, to receive and transmit data. The communication module may comprise a data store, or may share a data store of the electronic device 14. The communication module may comprise an intent store (intent registry), or this may be provided within the data store of the module/electronic device 14.

In embodiments, the communication module of the electronic device 14 may be configured to receive at least one parameter for the or each constraint associated with the action.

In embodiments, the or each parameter may be a default parameter and wherein the communication module receives the default parameter from the intent registry (intent store). Additionally or alternatively, the or each parameter may be a predetermined parameter, and wherein the communication module receives the predetermined parameter from the electronic device. Further additionally or alternatively, the or each parameter may be a subject-supplied parameter, and wherein the communication module receives the subject-supplied parameter from the subject device.

In embodiments, the communication module may be configured to communicate the at least one constraint and the or each received parameter to a user to select, reject or modify the or each parameter for each constraint.

In embodiments, the electronic device 14 may further comprise a display screen, wherein the communication module is configured to: generate a graphical user interface for display on the display screen, wherein the graphical user interface comprises at least one component to capture the or each parameter for each constraint.

Additionally or alternatively, the communication module may be configured to communicate the at least one constraint as an audio signal.

In embodiments, the communication module may receive at least two constraints for the action, and is configured to: determine a priority order for the at least two constraints, and communicate the constraints to a user in the determined priority order. The way the constraints are communicated to the user varies depending on the type(s) of user interface used by the communication module of the electronic device 14. Thus, in some cases the constraints are displayed on a screen in the determined priority order, in other cases the constraints may be read out to the user in the priority order, and in other cases a combination of these techniques may be deployed.

In embodiments, the electronic device 14 comprises a storage medium configured to store the received one or more parameters for each constraint, the intent received from the subject device 12, and the action data for the intent received from the intent registry 16.

In embodiments, the electronic device 14 is an envoy device. In particular, the envoy device may be a portable computing device, smartphone, smartwatch, or embedded device.

In embodiments, the communication module may be configured to receive a natural language description of the action data from the intent registry 16, and to communicate the natural language description to a user of the electronic device 14.

The intent registry (local to the envoy device, located in the subject device, and/or a remote intent registry) may be configured to store 'localizations' of the action data, where the localizations provide the action data in an appropriate format or language for a particular region, area, or country. For example, if a user of an envoy device is a Portuguese speaker, the envoy device may be configured to use Portuguese and may request that the intent registry serves action data in Portuguese. The language preference may be more complex—a user may specify that the action data is provided in Brazilian Portuguese, and if this is not available, to provide the action data in English or Portuguese. Thus, the envoy deice 14 may be configured to transmit any such localization preferences to the intent registry together with its request for action data. In embodiments, the communication module may be configured to: transmit at least one language preference of the electronic device to the intent registry; and receive the natural language description of the action data in a preferred language.

In embodiments, the communication module may be configured to use one or more of a local area network, a wireless local area network (WiFi), Bluetooth, Bluetooth Low Energy, or a mobile network.

A further aspect of the present techniques provides an intent registry 16 comprising: a data store for storing a plurality of action data, wherein each of the action data comprises an action associated with a pre-registered action identifier, and at least one constraint associated with the action; and communication module configured to: receive a request for action data, wherein the request specifies an action identifier; retrieve the action data for the specified action identifier from the data store; and pass the retrieved action data.

In embodiments, the communication module of the intent registry 16 may be further configured to: receive a new action data from a third party; determine if the received new action data matches any of the stored action data in the data store; and, if there is no match, store the new action data in the data store. As mentioned above, the intent registry 16 stores a single intent for each action, which avoids duplication. Thus, different manufacturers of subject devices 12 can configure their subject devices to output the same, single, unique action ID when they wish to perform a particular action.

Additionally or alternatively, the communication module of the intent registry 16 is further configured to: receive new action data from a third party; determine if the received new action data matches any of the stored action data in the data store; and, if there is no exact match, determine if there is a partially-matched action data in the data store; and if so, add the new action data to the partially-matched action data to provide a new version of the partially-matched action data; and store the new version of the partially-matched action data in the data store. In this way, existing action data is updated with information from the new action data, instead of storing multiple versions of action data for a particular action.

In embodiments, the stored action data in the intent registry 16 may be immutable. If changes are submitted to a particular action data stored in the intent registry 16, a new version of the action data is stored in the intent registry 16 with a higher version number.

In embodiments, some or all of the action data stored in the data store of the intent registry 16 comprises one or more default parameters for at least one constraint associated with each action.

In embodiments, the communication module of the intent registry 16 may be further configured to pass the one or more stored parameters. As mentioned above, the intent registry may be part of a subject device, the envoy device or provided as a remote intent registry. Thus, if the intent registry 16 is part of the subject device or is a remote intent registry, the intent registry is configured to transmit the stored parameters to the envoy device 14. If the intent registry is a local intent registry in the envoy device 14, the stored parameters are passed to the part of the envoy device 14 which is preparing to invoke an action. The intent registry may be part of the communication module of the envoy device, or may be provided as a separate element in the envoy device.

The action data stored in the intent registry 16 comprises a natural language description of each action stored in the data store.

In embodiments, the request for action data may be received from an electronic device and the intent registry is located remote to the electronic device. Additionally or alternatively, the request for action data is received from a communication module of an electronic device and the intent registry is provided within the electronic device.

Figure 5:
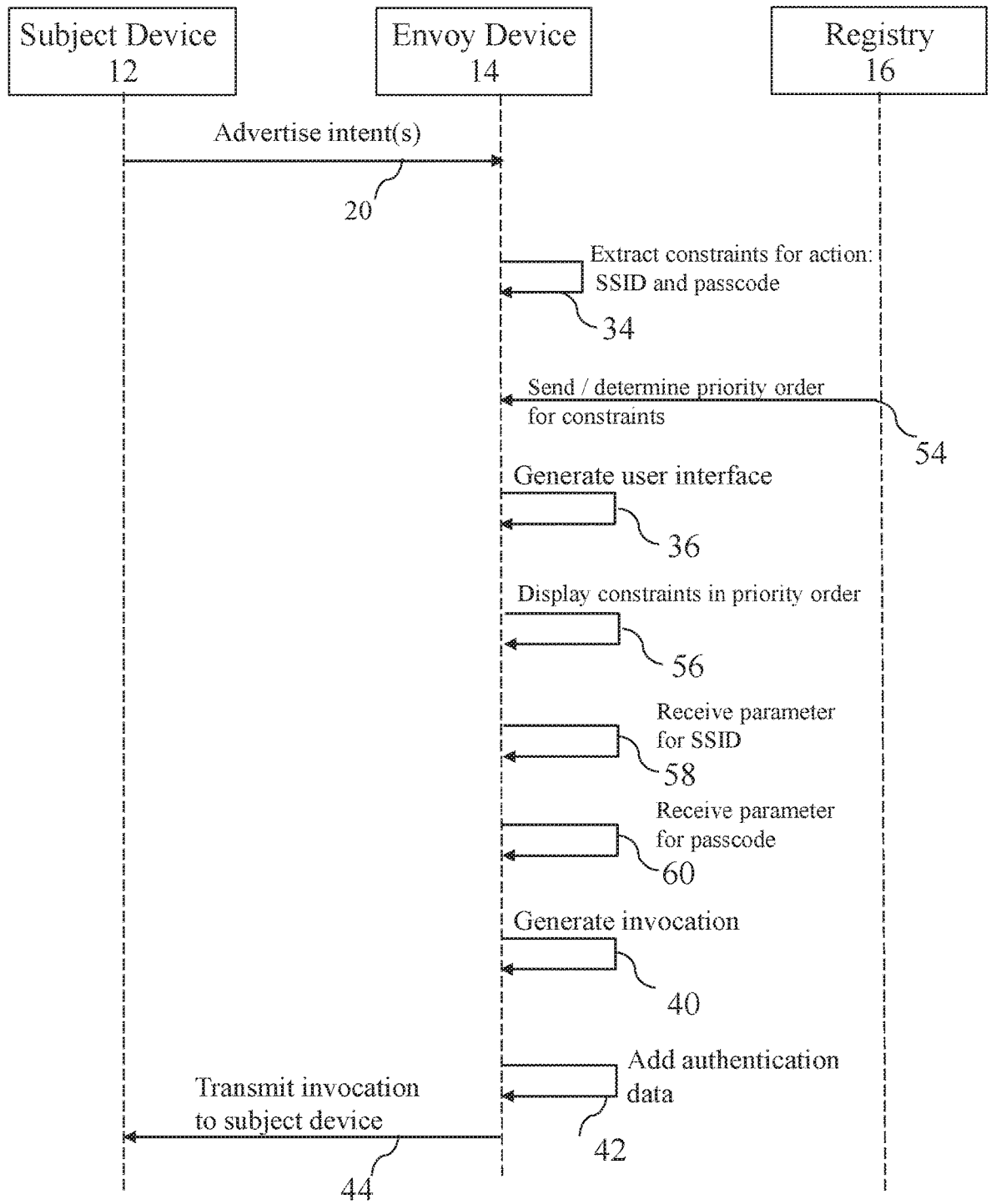
FIG. 5 shows a schematic diagram of the steps to operate an envoy device to connect a subject device to a wireless network.

Turning now to FIG. 5, this shows a schematic diagram of the steps to operate an envoy device 14 to connect a subject device 12 to a wireless network. In the illustrated embodiment, after steps 20 to 30 are performed (as described with reference to FIG. 2), the envoy device 14 extracts the constraints for the action of connecting to a wireless network from the received action data (step 34). The extracted constraints in this example are SSID and passcode. The envoy device 14 may be configured to receive a priority order for the constraints, either with the action data or separately (step 54). Here, the SSID constraint requires a parameter before the passcode constraint parameter can be received, as mentioned above. The envoy device 14 may be configured to generate a user interface (step 36) and to display the constraints in priority order (step 56), such that the SSID constraint is displayed first or before the passcode constraint. The generated user interface comprises a component adapted to capture the parameters for each constraint. The component may be a free-text box, drop-down list, or similar means to capture a parameter. The component to capture the SSID constraint parameter is displayed first or above or before the component to capture the passcode constraint parameter, in response to the received priority order.

The envoy device 14 receives a parameter for the SSID via the component to capture the SSID constraint parameter (step 58). The parameter is the name of a WiFi network to which the subject device 12 is to connect. Thereafter, the envoy device 14 receives a passcode via the component to capture the passcode constraint parameter (step 60). Once both parameters have been captured, the envoy device 14 generates an invocation (step 40) and transmits the invocation to the subject device 12 (step 44). The received parameters for SSID and passcode may be stored in the envoy device 14 if the parameters have a flag or meta-data indicating that the parameters should be saved. The received parameters may be saved as a group/pair of known parameters, which may speed-up WiFi configuration for the same network in the future.

As mentioned above, the invocation data may be sent to more than one endpoint. For example, there may be a primary target/endpoint for the invocation (which is where the action is to be performed) and a secondary endpoint which is 'copied in' on the invocation data sent to the primary endpoint. An example of this is explained with reference to FIG. 6.

Figure 6:
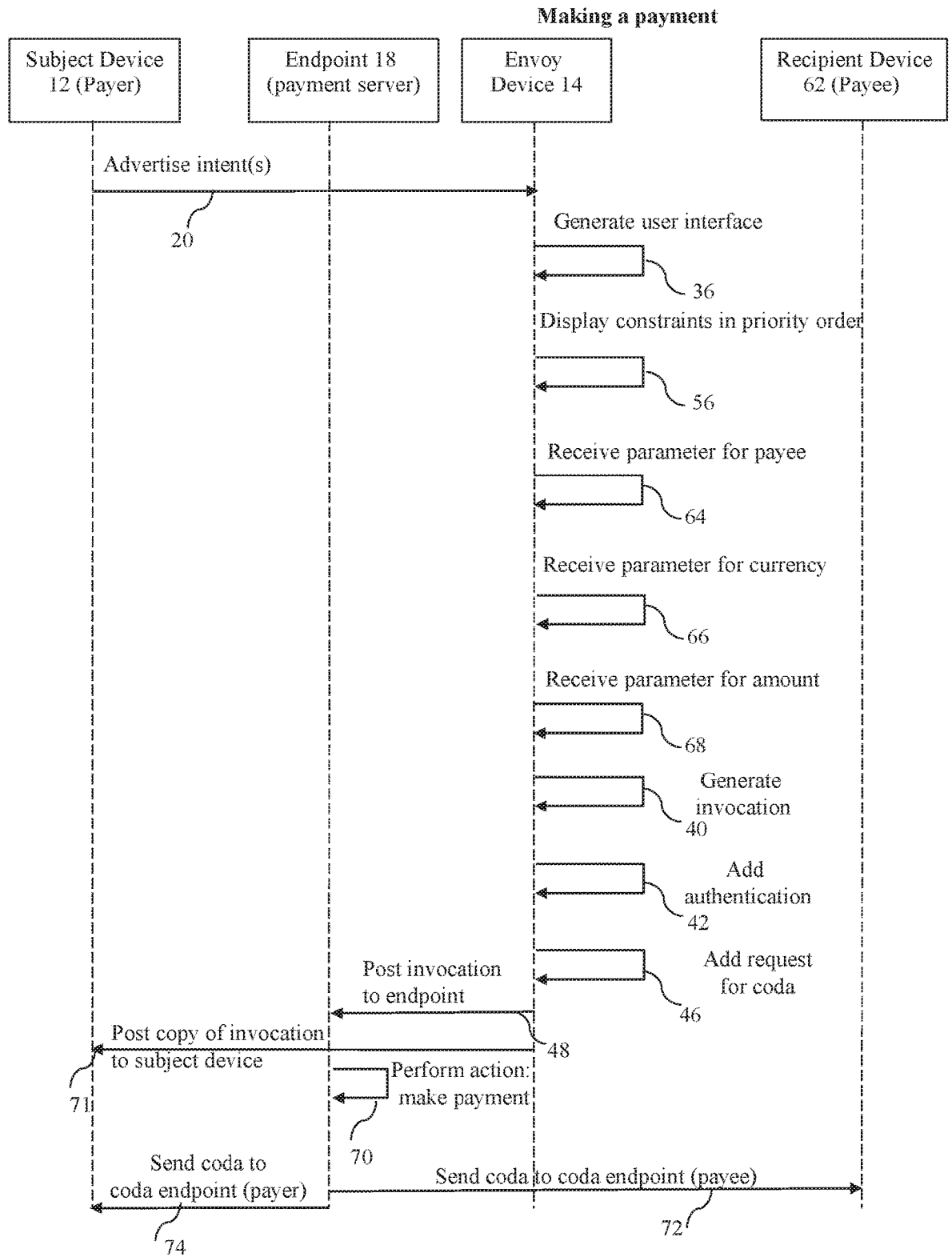
FIG. 6 shows a schematic diagram of the steps to operate an envoy device to configure a subject device to make a payment.

FIG. 6 shows a schematic diagram of the steps to operate an envoy device 14 to configure a subject device 12 to make a payment. In this non-limiting example, the subject device 12 interacts with a recipient device 62 to enable a user of the subject device (payer) to make a payment to the owner of the recipient device 62 (payee). In the illustrated example, after steps 20 to 34 are performed (as described with reference to FIGS. 2 and 3), the envoy device 14 extracts the constraints for the action of connecting to a wireless network from the received action data (step 34). In this example, the invocation data may be sent to more than one endpoint—a primary and a secondary endpoint. The payment is made to the payee via a payment server (e.g. a bank's payment server), which is the primary endpoint 18 in this example, since it performs the payment action.

The envoy device 14 generates a user interface 36 to prompt the payer for information about the payment (step 36). The constraints associated with the payment action are displayed in priority order (step 56), if applicable. In this example, the constraints comprise "payee", "currency" and "payment amount", and the priority order may specify that the "currency" constraint is prioritized over the "payment amount". In embodiments, there may be no priority order, and the envoy device 14 decides on an order in which to display the constraints. Thus, while the illustrated example shows that the parameter for the payee constraint is received first (step 64), then the parameter for currency (step 66) and then the parameter for the payment amount (step 68), the constraints may be displayed in any other order.

Once the parameters are received by the envoy device 14, the envoy device generates an invocation data and adds a request for a coda to the invocation data (step 46). The request for a coda may be provided within the intent broadcast by the subject device 12, and/or may be provided within the action data, as certain actions may require a coda by default. The invocation data specifies that the coda is sent to at least two coda endpoints: to the payer device (subject device 12) and to the payee device (recipient device 62), so that both parties know when the payment has been completed.

In embodiments, the generated invocation data may be sent by the envoy device 14 to the primary endpoint 18 (step 48), which may be a payment server or service that is configured to make payments between two parties. The primary endpoint 18 performs the action to make the payment using the invocation data (step 70), and on completion, the endpoint 18 sends a coda to the payer (step 74) and to the payee (step 72). In embodiments, a coda may also be sent to the envoy device 14.

The generated invocation data may also be sent by the envoy device 14 to a secondary endpoint (step 71), such as the subject device 12. Thus, in embodiments, the envoy device 14 sends the generated invocation data to both the primary endpoint 18 and the secondary endpoint (subject device 12). In the case where the primary endpoint 18 is unavailable or cannot be contacted (e.g. if there is a fault in the communication channel used to send the invocation data), then both the secondary endpoint and the envoy device 14 are configured to continue attempting to send the invocation data to the primary endpoint 18. This may provide the subject device 12 (secondary endpoint) with a notification that the payment is being attempted, and may enable the payment to be executed faster and more reliably. For example, if the subject device 12 has better connectivity with the primary endpoint 18, then the invocation data is transmitted to the primary endpoint 18 even if the envoy device 14 loses its connection with the primary endpoint 18. The primary endpoint 18 may be configured to process the invocation data once only, to ensure that the payment is not duplicated, by for example, checking whether a received invocation data matches invocation data received already (within a particular time frame).

In a related aspect, the present techniques provide a non-transitory data carrier carrying code which, when implemented on a processor, causes the processor to carry out the methods described herein.

The techniques further provide processor control code to implement the above-described systems and methods, for example on a general purpose computer system or on a digital signal processor (DSP). The techniques also provides a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. The program code may execute entirely on the user's electronic device, partly on the electronic device and partly on a remote computer or entirely on the remote computer or server. In the latter scenario, the remote computer may be connected to the user's electronic device through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the above-described method.

In a further alternative, a preferred embodiment of the present techniques may be realized in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognize that present techniques have a broad range of applications, and that the embodiments may take a wide range of modifications without departing from the any inventive concept as defined in the appended claims.

The invention claimed is:

1. A machine-implemented method for operating an electronic device to configure a subject device remote therefrom, the method performed at the electronic device comprising:

receiving an intent from the subject device, wherein the received intent comprises an action identifier identifying an action that is requested to be performed;

obtaining action data associated with the action identifier from an intent store remote from the subject device by a lookup using the action identifier to retrieve the action data associated with the action identifier, wherein the action data comprises at least two constraints that each specify one or more parameters required for the subject device to perform the requested action;

determining a priority order for the constraints;

providing an output based on or in response to the one or more parameters to a user and communicating the constraints to a user in the determined priority order via a user interface on the electronic device to enable the user to configure the subject device;

receiving, via the user interface, a user input comprising parameter values in the determined priority order in response to the output;

generating invocation data in response to the received user input, wherein the invocation data comprises the ordered parameter values required by the subject device to perform the action;

providing the invocation data to the subject device to configure the subject device to perform the action, wherein the invocation data is previously undefined on the subject device; and providing a copy of the invocation data to a secondary device, wherein the copy of the invocation data is utilized to configure the subject device to perform the action when the providing the invocation data to the subject device has failed.

2. The machine-implemented method as claimed in claim 1, wherein receiving the one or more parameters further comprises:

receiving at least two parameters, wherein at least one of the parameters is a default parameter and wherein the step of receiving the at least one default parameter comprises receiving the at least one default parameter from the intent store.

3. The machine-implemented method as claimed in claim 1, wherein receiving the one or more parameters further comprises:

receiving at least two parameters, wherein at least one of the one or more parameters is a predetermined parameter, and wherein the step of receiving the at least one predetermined parameter comprises retrieving the at least one predetermined parameter from the electronic device.

4. The machine-implemented method as claimed in claim 1, further comprising communicating the at least one received parameter to a user to select, reject or modify the or each parameter.

5. The machine-implemented method as claimed in claim 1, wherein receiving the one or more parameters for the at least one constraint comprises:

configuring a user interface on the electronic device to communicate the at least one constraint to a user, and to receive the or each parameter for each constraint.

6. The machine-implemented method as claimed in claim 1 wherein the step of receiving an intent comprises receiving at least one endpoint address indicating where the action is to be performed, the method further comprising:

extracting the at least one endpoint address from the received intent; and passing the invocation data to the at least one endpoint address specified in the received intent.

7. The machine-implemented method as claimed in claim 6 wherein the endpoint address comprises a primary endpoint as the subject device and a secondary endpoint as the secondary device.

8. The machine-implemented method as claimed in claim 1 further comprising:

determining at least one endpoint address from the received intent, wherein the at least one endpoint address specifies where the action is to be performed; and passing the invocation data to the at least one determined endpoint address.

9. The machine-implemented method as claimed in claim 1 wherein the step of generating invocation data comprises including a request for a receipt confirming that the action has been performed, and at least one address to which to send the receipt.

10. The machine-implemented method as claimed in claim 1 further comprising receiving at least one authorization indicating that the electronic device is authorized to generate the invocation data for one or more intents.

11. The machine-implemented method as claimed in claim 1, wherein receiving the one or more parameters for the at least one of the constraints associated with the action comprises receiving a save flag for the or each parameter indicating that the parameter is to be saved on the electronic device.

12. The machine-implemented method as claimed in claim 1, further comprising, prior to providing the invocation data to the subject device:

adding a coda request to the invocation data, the coda comprising a receipt confirming that the action has been performed; and adding a coda address to the invocation data, the coda address defining the location to which the coda is to be sent.

13. An electronic device for configuring a device, the electronic device comprising a communication module configured to:

receive an intent from a first device, wherein the received intent comprises an action identifier identifying an action that is requested to be performed;

obtain action data associated with the action identifier from an intent store remote from the first device by a lookup using the action identifier to retrieve the action data associated with the action identifier, wherein the action data comprises at least two constraints that each specify one or more parameters required to perform the required action;

determine a priority order for the constraints;

provide an output based on or in response to the one or more parameters to a user and communicate the constraints to a user in the determined priority order via a user interface on the electronic device to enable the user to configure the first device;

receive, via the user interface, a user input comprising parameter values in the determined priority order in response to the output;

generate invocation data in response to the received user input, wherein the invocation data comprises the ordered parameter values required by a device to perform the action;

provide the invocation data to the first device to configure the first device to perform the action, wherein the invocation data is previously undefined on the first device or provide the invocation data to a second device to configure the second device to perform the action, wherein the invocation data is previously undefined on the second device; and providing a copy of the invocation data to a tertiary device, wherein the copy of the invocation data is utilized to configure the first device to perform the action when the providing the invocation data to the first device has failed, or to configure the second device to perform the action when the providing the invocation data to the second device has failed.

14. The electronic device for configuring a device of claim 13, wherein the communication module is further configured to, prior to providing the invocation data to the first device:

add a coda request to the invocation data, the coda comprising a receipt confirming that the action has been performed; and add a coda address to the invocation data, the coda address defining the location to which the coda is to be sent.

15. A machine-implemented method for operating an electronic device to configure a first device remote therefrom, the method performed at the electronic device comprising:

receiving an intent from a second device, wherein the received intent comprises an action identifier identifying an action that is requested to be performed by the first device;

obtaining action data associated with the action identifier from an intent store remote from the first device by a lookup using the action identifier to retrieve the action data associated with the action identifier, wherein the action data comprises at least two constraints that each specify one or more parameters required for the first device to perform the requested action;

determining a priority order for the constraints;

providing an output based on or in response to the one or more parameters to a user and communicating the constraints to a user in the determined priority order via a user interface on the electronic device to enable the user to configure the first device;

receiving, via the user interface, a user input in response to the output;

generating invocation data in response to the received user input, wherein the invocation data comprises the ordered parameter values required by the first device to perform the action;

providing the invocation data to the first device to configure the first device to perform the action, wherein the invocation data is previously undefined on the first device; and providing a copy of the invocation data to the second device, wherein the copy of the invocation data is utilized to configure the first device to perform the action when the providing the invocation data to the first device has failed.

16. The machine-implemented method of claim 15, further comprising, prior to providing the invocation data to the first device:

adding a coda request to the invocation data, the coda comprising a receipt confirming that the action has been performed; and adding a coda address to the invocation data, the coda address defining the location to which the coda is to be sent.

* * * * *